No. 770,782. PATENTED SEPT. 27, 1904.
J. C. SINGLETON.
MACHINE FOR WINDING BROOMS.
APPLICATION FILED MAY 23, 1903.
NO MODEL. 2 SHEETS—SHEET 2.

Witnesses: Inventor;
John C. Singleton
By Robert Catherwood
Att'ys

No. 770,782.

Patented September 27, 1904.

UNITED STATES PATENT OFFICE.

JOHN C. SINGLETON, OF EVANSTON, ILLINOIS.

MACHINE FOR WINDING BROOMS.

SPECIFICATION forming part of Letters Patent No. 770,782, dated September 27, 1904.

Application filed May 23, 1903. Serial No. 158,462. (No model.)

*To all whom it may concern:*

Be it known that I, JOHN C. SINGLETON, a citizen of the United States, residing in the city of Evanston, Cook county, Illinois, have invented a new and useful Improvement in Machines for Winding Brooms, of which the following is a specification.

The object of my invention is to facilitate the manufacture of brooms, feather dusters, and analogous articles, and especially to provide mechanism which shall conveniently and economically wind wire about brush material—such as broom-corn, feathers, bristles, twigs, fiber, &c.—and secure the same to suitable handles to form a broom, meaning by the term "broom" to include also dusters, brushes, and analogous articles.

Figure 1:
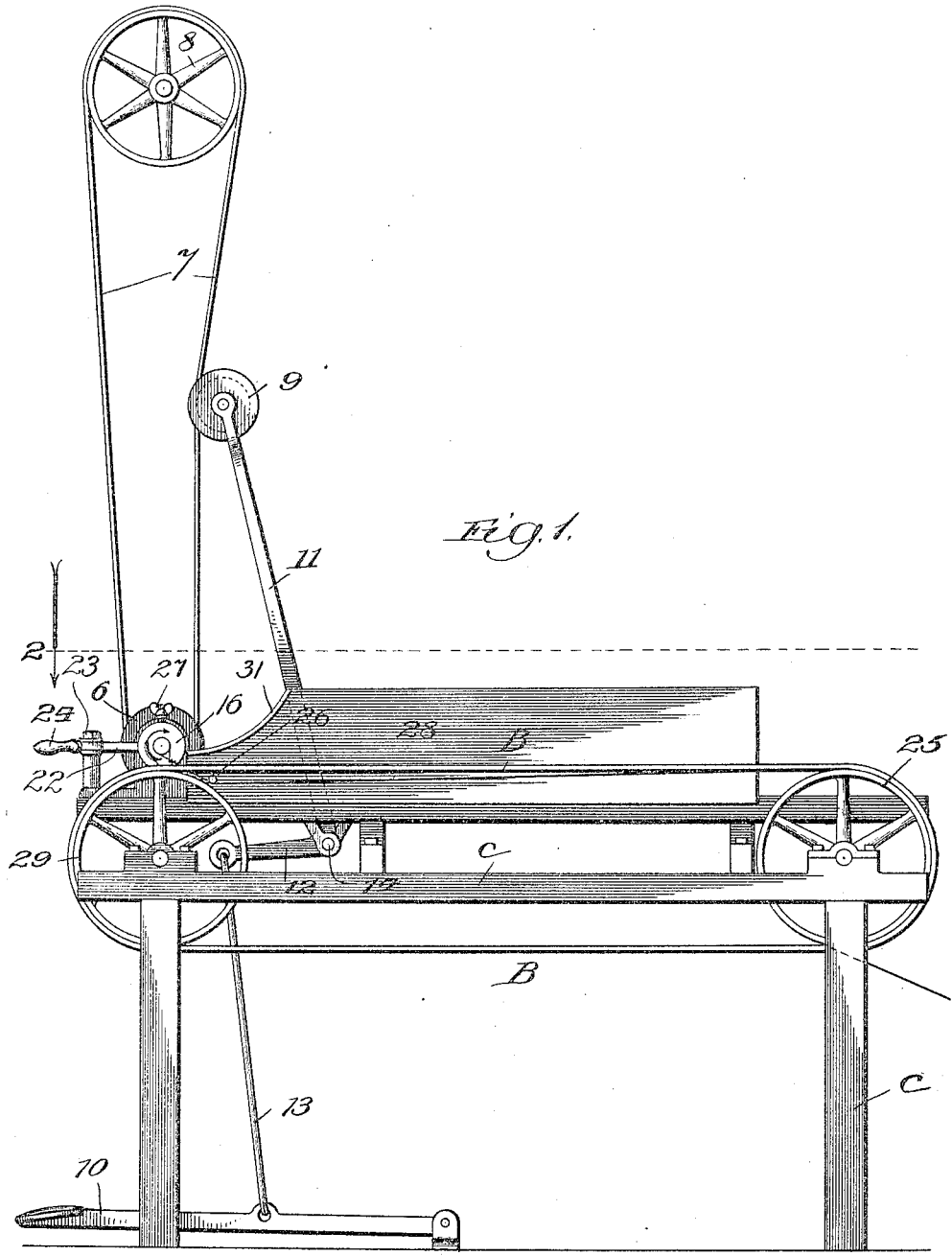
Figure 2:
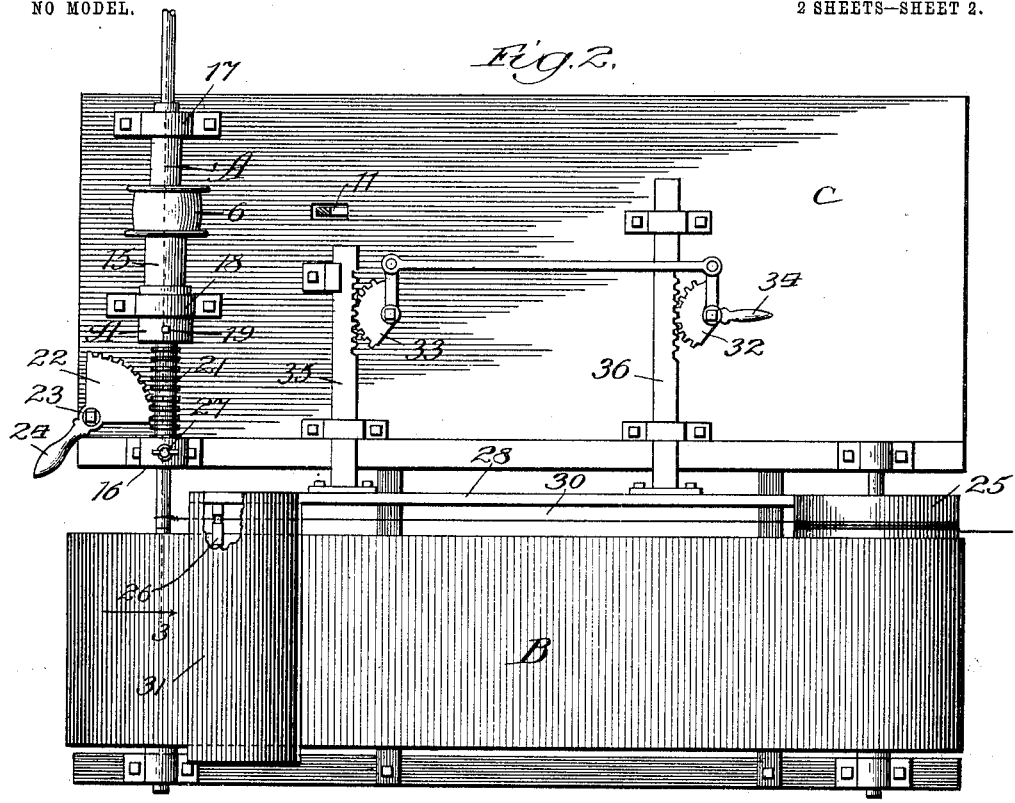
Figure 3:
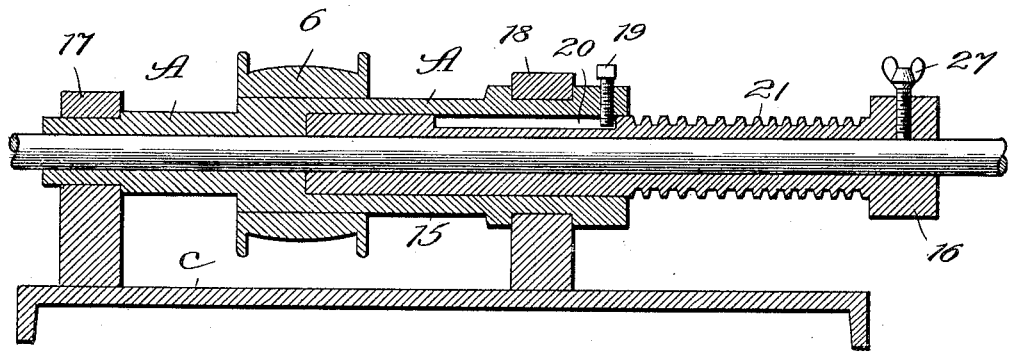

In the drawings, wherein like letters and numbers denote like parts throughout the several figures, Figure 1 is a side view of a machine embodying my invention, showing its connections with power. Fig. 2 is a top view of the same on line 2 of Fig. 1, and Fig. 3 is a sectional view of the barrel and chuck for holding and turning the handle.

A denotes a barrel in which a chuck is fitted; B, an endless belt, traveling carrier, or feed-apron for spreading and feeding the brush, and C any suitable frame for supporting the machine. The barrel A is made to revolve during the winding operation by means of the pulley 6, which is positively attached thereto. Any suitable intermittent connection with power under the control of the operator may be used. I have shown the power communicated from overhead shafting by means of pulley 8, mounted thereon and revolving clockwise, and the loose belt 7, passing over pulley 6. The belt 7 slips or runs loosely over pulley 6 until the slack is taken up by operating-treadle 10, which pushes forward tightening-pulley 9. Tightening-pulley 9 is mounted on the long arm 11 of a bell-crank 12, pivoted at 14, the short arm of which is connected by a link 13 to the treadle 10. The operator may thus rotate the barrel by pressing the treadle 10 and stop it by removing the pressure.

The revolving barrel A is mounted in suitable bearings on the table C and held in place by collars 17 and 18. Telescoping or fitting into the barrel and secured thereto is the chuck 16. The bores of the chuck and barrel are adapted to receive and have slipped into them endwise the handle of a broom. This bore should be large enough to receive handles of the largest sizes and the broom and chuck clamped or otherwise positively locked together to prevent the handle from slipping. A clamp operated by thumb-screw 27 is provided at the outer end of the chuck for the purpose of holding the handle positively, so that it will revolve with the chuck and barrel. The chuck and barrel are suitably fastened together by any spline or key mechanism which will compel the chuck to rotate with the barrel, while permitting it to be drawn out or pushed into the barrel during its rotation. It is convenient to key them together by key 19 in keyway 20. The chuck and barrel therefore revolve together; but the former may be drawn out from the latter or forced back a distance equal to the length of the keyway 20, a distance which is sufficient for ordinary operations. This movement may be obtained during rotation by providing the externally-projecting periphery of the chuck with the ring-surface 21 and providing a ring-toothed segmental gear 22, pivoted at 23, operated by lever-handle 24 and meshing with the rings 21 in such manner as to draw out or force back the chuck into the barrel by turning the handle 24 without arresting or interfering with the rotation of the chuck and barrel. In this manner the chuck will shift the handle endwise while revolving it and cause the wire to wind higher or lower on the handle, as desired.

The brush—such as broom-corn, feathers, bristles, fiber, or other brush material—is deposited upon a traveling carrier or other forwarding mechanism which I prefer to construct in the form of the endless belt or apron B. The butts are placed endwise against the guide or butt board 28 and projecting over the opening 30 between the belt and the guide-board. Belt B passes over the drum or pulley 25 and the pulley 29, the shafts of both pulleys being parallel. Pulley 29 is mounted in suitable bearings directly below the axis of the chuck, so that the belt-carrier travels in a plane slightly below the projecting handle of the broom. The wire, cord, or other suitable binding material used in winding the broom is first passed around the drum or pulley 25 several times and then carried under the grooved wire guide or finger 26 and fastened to the end of the broom-handle projecting from the chuck A, which is forced out by lever 24 to bring the handle end into the desired alinement with the wire. Rotation of the chuck winds the wire or cord on the broom-handle and rotates pulley 25, around which the wire or cord is wrapped. This drives belt B, with the brush upon it, toward the handle in the chuck. The guide 26 is so placed that the wire is held below the butts. The grooved chuck is so shifted that the butts which project over the edge of the belt are caught between the wire and the handle as the latter revolves in the chuck and are wound in successive layers. When it is desired to wind the material farther back or farther down the handle, the chuck is moved forward or backward by the segmental gear 22. To prevent the material from bunching as it is fed by the belt between the wire and handle and also to prevent the material wound on the broom from interfering with the material on the belt, I provide the sloping shield 31, placed across the belt and sloping forward from supports placed on the side of the carrier toward the wire and adapted to spread the material and feed it evenly. The butt-board 28, against which the butts or binding ends of the broom-corn or other brush material are placed, may be shifted nearer or farther from the carrier-belt, thus diminishing the opening 30 and decreasing the projection of the butts over the edge of the carrier by turning segmental gears 32 and 33 by means of lever 34. These gears each mesh with teeth on the racks 35 and 36 and are adapted to advance or withdraw as the segmental gears are turned, thereby advancing or withdrawing the butt-board 28, attached or suitably mounted on the racks, while maintaining its parallelism. The racks are held by collars in position on the table C.

While I have shown the belt or feed-apron B, it is obvious that in binding very heavy brooms or dusters it may be found desirable to substitute therefor other forwarding mechanism.

Having thus described my invention, what I claim as new, and desire to secure by Letters Patent, is—

1. In a machine for winding brooms, dusters and analogous articles, the combination of means for rotating the handle and winding wire about it, means for feeding brush material in binding position between said handle and wire in successive layers, and means for shifting said handle longitudinally during the winding operation.

2. In a broom-winding machine, a chuck adapted to hold a handle lengthwise its axis, means for securing said handle therein, a revolving barrel enveloping one end of said chuck, and means for drawing said chuck in and out of said barrel during the rotation of said barrel and chuck.

3. A broom-winding machine having a feed-belt adapted to carry brush material in binding position to a broom-handle, a chuck adapted to support and rotate said handle above and substantially at right angles to the path of said belt, and means for rotating said chuck and belt and for winding the wire on the handle simultaneously whereby the brush is fed between a wire and handle as the latter rotates and the wire is wound thereon.

4. In a machine for winding brooms, a feed-belt mounted on pulleys adapted to convey brush material in binding position, a rotary support adapted to hold a broom-handle and means for advancing said belt toward the broom-handle and rotating said support and winding the wire on the handle simultaneously, whereby said material is fed between a broom-handle and a wire attached thereto, for the purposes described.

5. In a broom-winding machine, a rotating barrel, a chuck mounted and longitudinally adjustable therein adapted to hold a broom-handle, means for moving said chuck longitudinally while thus rotated, means for winding wire on the handle, a feed-belt moving substantially at right angles to said chuck and adapted to feed brush material crosswise thereof beneath a wire or cord attached to said handle.

6. In combination with means for winding wire about the end of a handle, an endless belt, a butt-board in substantial parallelism with said belt, means for spreading layers of brush material upon said belt, the ends projecting over the edge of said belt against said butt-board, said butt-board being adapted to aline said butts and said belt to advance them between the wire and handle, whereby said brush is wound in successive layers about said handle, for the purposes described.

7. In combination with means for winding a wire about the end of a handle, a brush-carrier, a butt-board in substantial parallelism thereto, means for spreading the brush material upon said carrier, the ends projecting beyond the edge thereof against said butt-board, means for advancing and withdrawing said butt-board to and from said carrier while maintaining said parallelism, and means for feeding said brush evenly between said wire and handle, for the purposes described.

8. In a broom-winding machine, means for winding wire about the end of a handle, an endless belt, means for spreading and arranging brush material thereon, and means for feeding said brush material evenly between said wire and handle, for the purposes described.

9. In a broom-winding machine, the combination of a rotary chuck, adapted to hold a broom and wind a wire thereon, wire-feeding mechanism, means for adjusting said chuck longitudinally, a feed-belt traveling in a horizontal plane substantially at right angles to and slightly below the axis of said chuck, said apron being adapted to feed brush material between said wire and broom, and means for simultaneously rotating said chuck and advancing said feed-belt, for the purposes described.

JOHN C. SINGLETON.

Witnesses:
  ANDREW R. SHERIFF,
  CHARLES L. HINE.